April 5, 1927.  W. L. BRYANT  1,623,574
MICROMETER GAUGE
Original Filed Nov. 18, 1922
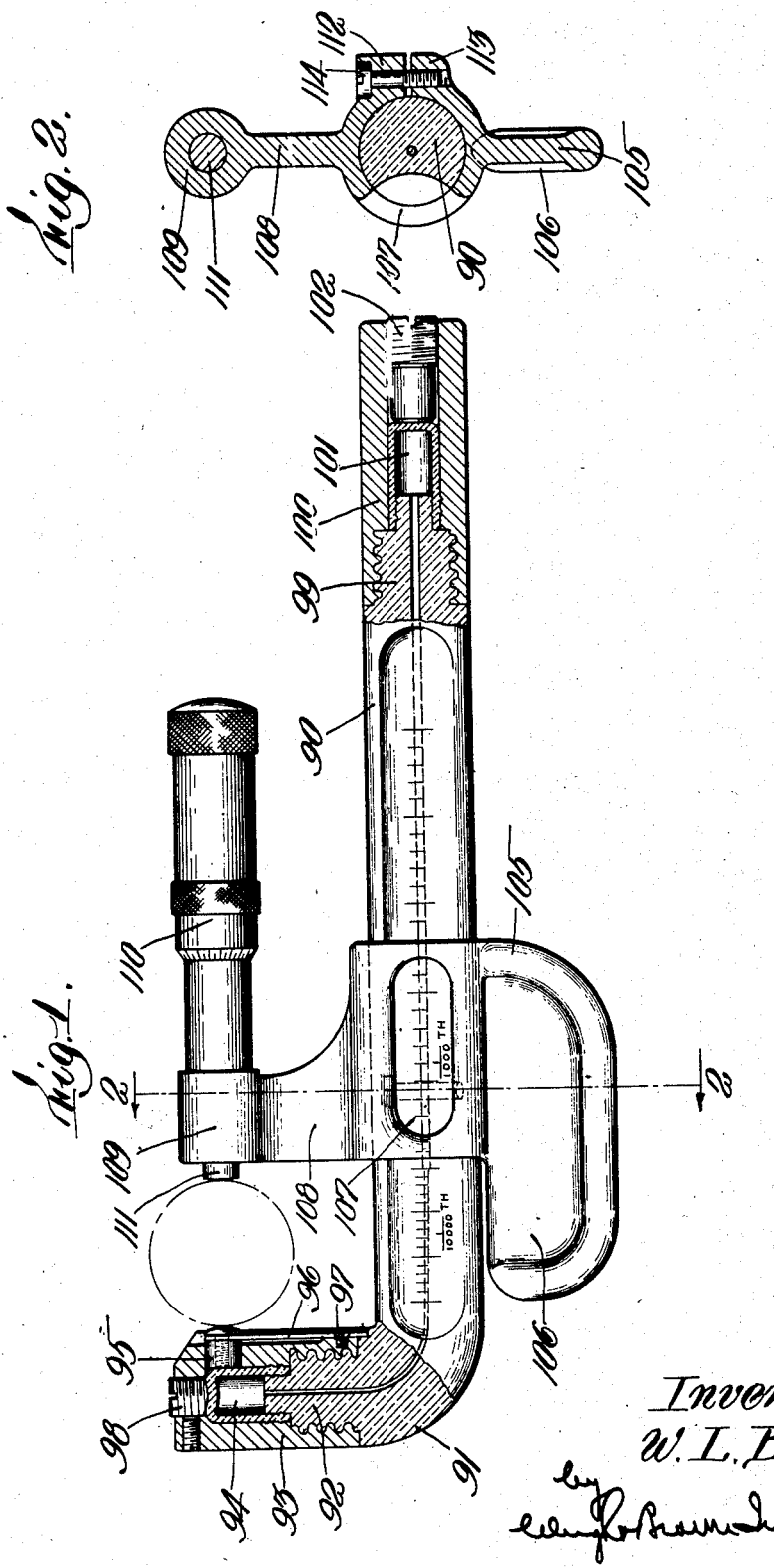
Inventor:
W. L. Bryant Patented Apr. 5, 1927.

1,623,574

UNITED STATES PATENT OFFICE.

WILLIAM L. BRYANT, OF SPRINGFIELD, VERMONT.

MICROMETER GAUGE.

Original application filed November 18, 1922, Serial No. 601,731. Divided and this application filed July 6, 1925. Serial No. 41,553.

This invention relates to gauges of that type in which the measuring indication is made by the length of a column of liquid in a graduated capillary tube. The subject matter of this present application relates to devices for measuring outside diameters, being divided out from my application for patent Serial No. 601,731, filed November 18, 1922, for micrometer gauges.

For a more complete understanding of this application reference may be had to the accompanying drawings in which Figure 1 is a side elevation partly in section of the gauge.

Figure 2 is a section on line 2—2 of Figure 1.

In these figures the handle portion of the instrument is formed by means of a capillary tube 90 one end of which as at 91 is bent to extend at right angles to the main portion of the tube so that the tube is L shaped. This bent portion has its end 92 threaded for the reception of a cylindrical cap or housing 93 adapted to contain the liquid reservoir 94 against which impinges the inner end of a work-engaging pin 95. This pin may be held in position by means of a leaf spring 96 engaging it at one end and made fast at its opposite end at 97 to the portion 93. In this form also a threaded plug 98 may be employed to adjust the initial length of the liquid column in the capillary tube 90. The opposite end of this capillary tube is reduced as shown at 99 for engagement with a cap 100 which houses the gas reservoir 101 and in the end of which is threaded the adjusting plug 102. By which the capacity of the gas reservoir may be adjusted. The reservoir 94 being supplied with liquid, and the parts being assembled, decreasing the capacity of this reservoir somewhat causes the liquid therein to extend therefrom as a column within the capillary tube. This decrease of capacity is effected to such an extent as to cause this column to extend within the capillary tube to any desired convenient distance. Slidably mounted on the main portion of the capillary tube is a bracket member 105 having a handle portion 106 and an opening 107 therethrough through which the graduations on the capillary tube may be observed. Opposite to the handle portion 106 this member has an outwardly extending web 108 at the end of which is an eye 109 for the reception of a micrometer screw 110. The inner end of this screw is formed as an abutment 111 which is positioned opposite to the pin 95, the pin and the portion 111 forming the two work-engaging elements of a pair of outside calipers. The bracket 105, as shown in Figure 2, is formed split, the slit portions 112 and 113 being adapted to be brought together for clamping the bracket in any desired position lengthwise of the tube by means of a screw 114.

In the use of this form of the instrument the bracket is adjusted as close as possible to the desired position to bring the elements 95 and 111 the proper distance apart. The micrometer screw 110 is then adjusted so that the end of the liquid column will be in a convenient position when the proper size of work has been reached, as it is being ground or otherwise finished, the work position between the pin and abutment causing the pin to compress the reservoir 94 to an extent indicated by the movement of the liquid column in the capillary tube.

In the drawing is shown also the idea of employing a capillary tube having two sizes of internal diameter, the end of the liquid column appearing in the portion of smaller diameter as the correct finished size of the work is approached so that the accuracy of the instrument may be made greater at that time.

Having thus described one embodiment of this invention, it should be evident that many changes and modifications might be made therein without departing from its spirit or scope as defined by the appended claims.

I claim:

1. In a measuring instrument, a transparent graduated capillary tube, a bracket member slidable thereon, means to clamp said member in position, a micrometer screw carried by said member, a flexible walled liquid reservoir connected to one end of said tube and communicating with the bore thereof, an element movable to engage said reservoir with more or less pressure and between which and said screw an object to be measured may be placed, said reservoir being filled with a liquid extending as a liquid column in said tube, and a gas pressure reservoir at the opposite end of said tube communicating with the bore thereof.

2. In a measuring instrument, a transparent graduated capillary tube having one end portion turned at an angle to the remainder thereof, a flexible walled liquid reservoir connected to said turned end and communicating with the bore thereof, an element movable to engage said reservoir with more or less pressure, a bracket slidable on said tube, means to clamp said bracket in position thereon, an element carried by said bracket in alinement with said movable element, said elements receiving an object to be measured therebetween, and a gas pressure reservoir at the opposite end of said tube and communicating with the bore thereof.

3. In a measuring instrument, an L shaped transparent graduated capillary tube having threaded extremities, flexible walled reservoirs at each end of said tube in communication with the bore thereof, a cap engaging each of said threaded ends and retaining said reservoirs in position, an element slidable through the side wall of one of said caps and engageable with the reservoir therein, a bracket adjustable fixed to said tube, and an element carried by said bracket in position to clamp an object against said slidable element.

4. In a measuring instrument, an L shaped transparent graduated capillary tube having threaded extremities, flexible walled reservoirs at each end of said tube in communication with the bore thereof, a cap engaging each of said threaded ends and retaining said reservoirs in position, an element slidable through the side wall of one of said caps and engageable with the reservoir therein, a bracket adjustable fixed to said tube, an element carried by said bracket in position to clamp an object against said slidable element, and plugs adjustably carried by each of said caps and bearing on the reservoirs therein by which the capacities of said reservoirs may be adjusted.

5. In a measuring instrument, a transparent graduated capillary tube, a reservoir at each end of said tube in communication with the bore thereof, means for adjusting the capacities of each of said reservoirs, a bracket adjustable along said tube, an element movable to vary the capacity of one of said reservoirs, and an element carried by said bracket in opposed relation to said movable element and between which elements an object to be measured may be placed.

In testimony whereof I have affixed my signature.

WILLIAM L. BRYANT.